United States Patent
Yi et al.

(10) Patent No.: US 9,510,220 B2
(45) Date of Patent: Nov. 29, 2016

(54) METHOD FOR MEASURING CHANNEL USING TRACKING REFERENCE SIGNAL IN WIRELESS COMMUNICATION SYSTEM AND DEVICE USING SAME

(71) Applicant: LG ELECTRONICS INC., Seoul (KR)

(72) Inventors: Yunjung Yi, Anyang-si (KR); Joonkui Ahn, Anyang-si (KR); Byounghoon Kim, Anyang-si (KR); Dongyoun Seo, Anyang-si (KR); Suckchel Yang, Anyang-si (KR); Hyangsun You, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 14/388,602

(22) PCT Filed: Mar. 28, 2013

(86) PCT No.: PCT/KR2013/002600
§ 371 (c)(1),
(2) Date: Sep. 26, 2014

(87) PCT Pub. No.: WO2013/147532
PCT Pub. Date: Oct. 3, 2013

(65) Prior Publication Data
US 2015/0063140 A1    Mar. 5, 2015

Related U.S. Application Data

(60) Provisional application No. 61/616,423, filed on Mar. 28, 2012, provisional application No. 61/619,923, filed on Apr. 3, 2012.

(51) Int. Cl.
*H04W 24/08* (2009.01)
*H04L 5/00* (2006.01)
*H04L 5/14* (2006.01)

(52) U.S. Cl.
CPC .............. *H04W 24/08* (2013.01); *H04L 5/005* (2013.01); *H04L 5/0048* (2013.01); *H04L 5/0051* (2013.01); *H04L 5/14* (2013.01); *H04L 5/001* (2013.01)

(58) Field of Classification Search
CPC ...... H04W 24/08; H04L 5/0048; H04L 5/14; H04L 5/0051; H04L 5/005; H04L 5/001
See application file for complete search history.

(56) References Cited

U.S. PATENT DOCUMENTS

2011/0092231 A1* 4/2011 Yoo ...................... H04B 1/7097
455/501
2011/0312316 A1* 12/2011 Baldemair .............. H04L 5/001
455/422.1

(Continued)

FOREIGN PATENT DOCUMENTS

WO   WO 2011/013990 A2   2/2011
WO   WO 2011/055986 A2   5/2011

(Continued)

OTHER PUBLICATIONS

3GPP TSG RAN WG1 Meeting #68, R1-120163, "Time and frequency tracking on new carrier type", Samsung, Agenda item: 7.2.2.1, Feb. 6-10, 2012.

*Primary Examiner* — Kwang B Yao
*Assistant Examiner* — Moo Ryong Jeong
(74) *Attorney, Agent, or Firm* — Birch, Stewart, Kolasch & Birch, LLP

(57) ABSTRACT

A method for measuring a channel in a wireless communication system is provided. A terminal receives a first reference signal from a primary cell. The terminal receives a second reference signal from a secondary cell corresponding to the primary cell. The terminal measures a channel for the secondary cell on the basis of the second reference signal. A subframe in which the second reference signal is received is signaled from the primary cell.

10 Claims, 14 Drawing Sheets

(56) References Cited

U.S. PATENT DOCUMENTS

2013/0094384 A1 4/2013 Park et al.
2013/0114535 A1* 5/2013 Ng .................... H04W 72/0446
 370/329

FOREIGN PATENT DOCUMENTS

| WO | WO 2011/100672 A1 | 8/2011 |
| WO | WO 2011/145886 A2 | 11/2011 |

* cited by examiner

METHOD FOR MEASURING CHANNEL USING TRACKING REFERENCE SIGNAL IN WIRELESS COMMUNICATION SYSTEM AND DEVICE USING SAME

CROSS REFERENCE TO RELATED APPLICATIONS

This application is the National Phase of PCT International Application No. PCT/KR2013/002600, filed on Mar. 28, 2013, which claims priority under 35 U.S.C. 119 (e) to U.S. Provisional Application No. 61/616,423, filed on Mar. 28, 2012 and 61/619,923 filed on Apr. 3, 2012, all of which are hereby expressly incorporated by reference into the present application.

BACKGROUND OF THE INVENTION

1. Field of the Invention

The present invention relates to wireless communication and, more particularly, to a method of measuring a channel in a wireless communication system and an apparatus using the same.

2. Related Art

Long Term Evolution (LTE) based on 3rd Generation Partnership Project (3GPP) Technical Specification (TS) release 8 is a strong next-generation mobile communication standard. Recently, the standardization of LTE-Advanced (LTE-A) based on 3GPP TS release 10 which supports multiple carriers is in progress.

As disclosed in 3GPP TS 36.211 V10.4.0 (2011-12) "Evolved Universal Terrestrial Radio Access (E-UTRA); Physical Channels and Modulation (Release 10)", reference signals, such as a Cell-specific Reference Signal (CRS), a Primary Synchronization Signal (PSS), and a Secondary Synchronization Signal (SSS), and control channels, such as a physical downlink control channel (PDCCH) and a physical broadcast channel (PBCH), are defined in the physical layer of 3GPP LTE/LTE-A.

Meanwhile, in the next-generation system, it is expected that carriers on which a reference signal and/or some or of all control channels are not transmitted in order to improve inter-cell interference and improve the extensibility of carriers will be introduced. Such type of carrier is called an extension carrier or a New Carrier Type (NCT).

SUMMARY OF THE INVENTION

An object of the present invention is to provide a method of measuring a channel in a wireless communication system and an apparatus using the same.

Another object of the present invention is to provide a method of preventing a collision between reference signals and an apparatus using the same.

In an aspect, a method for measuring a channel in a wireless communication system is provided. The method includes receiving a first reference signal from a primary cell, receiving a second reference signal from a secondary cell corresponding to the primary cell, and performing channel measurement on the secondary cell based on the second reference signal. A subframe in which the second reference signal is received is signaled by the primary cell.

In another aspect, a user equipment in a wireless communication system is provided. The user equipment includes a Radio Frequency (RF) unit configured to transmit and receive radio signals, and a processor connected to the RF unit and configured to receive a first reference signal from a primary cell, receive a second reference signal from a secondary cell corresponding to the primary cell, and perform channel measurement on the secondary cell based on the second reference signal. A subframe in which the second reference signal is received is signaled by the primary cell.

The first reference signal may be a Cell-specific Reference Signal (CRS) received every 1 ms, and the second reference signal may be a Tracking Reference Signal (TRS) received every 5 ms.

The subframe in which the second reference signal is received may be indicated by an offset based on a subframe #0.

The offset may be received through a downlink control channel of the primary cell.

The offset may be signaled from a Radio Resource Control (RRC) layer of the primary cell.

The wireless communication system may be a Time Division Duplex (TDD) system, and the second reference signal may be received in a downlink subframe or a special subframe.

If the subframe indicated by the offset is an uplink subframe, the second reference signal may be received in a downlink subframe that is included in subframes prior to the uplink subframe and that is a closest to the uplink subframe or a special subframe.

The wireless communication system may be a Time Division Duplex (TDD) system, and the second reference signal may be received in a downlink subframe.

If the subframe indicated by the offset is an uplink subframe or a special subframe, the second reference signal may be received in a downlink subframe that is included in subframes prior to the uplink subframe and that is a closest.

The performance of a wireless communication system can be improved.

Precise channel measurement can be measured.

DESCRIPTION OF EXEMPLARY EMBODIMENTS

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

User Equipment (UE) may be fixed or mobile and may also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

In general, a Base Station (BS) refers to a fixed station communicating with UE. The BS may also be called another terminology, such as an evolved-NodeB (eNB), a Base Transceiver System (BTS), or an access point.

Hereinafter, the application of the present invention based on 3GPP LTE based on 3GPP release 8 is described. This application is illustrative, and the present invention may be applied to a variety of wireless communication networks. LTE hereinafter includes LTE and/or LTE-A.

Figure 1:
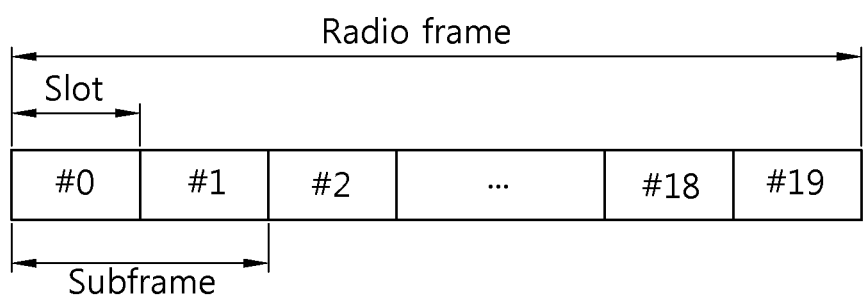
FIG. 1 illustrates the configuration of a radio frame in 3rd Generation Partnership Project (3GPP) Long Term Evolution (LTE).

FIG. 1 illustrates the configuration of a radio frame in 3rd Generation Partnership Project (3GPP) Long Term Evolution (LTE).

For the structure, reference may be made to 3rd Generation Partnership Project (3GPP) TS 36.211 V10.4.0 (2011-12) "Technical Specification Group Radio Access Network; Evolved Universal Terrestrial Radio Access (E-UTRA); Physical channels and modulation (Release 10)".

Referring to FIG. 1, the radio frame includes 10 subframes. A single subframe includes two contiguous slots. The slots within the radio frame are assigned slot numbers #0 to #19. The time that is taken to send a single subframe is called a Transmission Time Interval (TTI). The TTI may be a scheduling unit for data transmission. For example, the length of a single radio frame may be 10 ms, the length of a single subframe may be 1 ms, and the length of a single slot may be 0.5 ms.

A single slot includes a plurality of Orthogonal Frequency Division Multiplexing (OFDM) symbols in a time domain and includes a plurality of subcarriers in a frequency domain. The OFDM symbol is for representing a single symbol period because 3GPP LTE uses OFDMA in downlink and may be called another terminology depending on multiple access methods. For example, if SC-FDMA is used as an uplink multiple access scheme, an OFDM symbol may be called an SC-FDMA symbol. A Resource Block (RB) is a resource allocation unit, and the RB includes a plurality of contiguous subcarriers in a single slot.

The structure of the radio frame shown in FIG. 1 is only an example. Accordingly, the number of subframes included in a radio frame, the number of slots included in a subframe, or the number of OFDM symbols included in a slot may be changed in various ways. In 3GPP LTE, a single slot is defined to include 7 OFDM symbols in a normal Cyclic Prefix (CP), and a single slot is defined to include 6 OFDM symbols in an extended CP.

Figure 2:
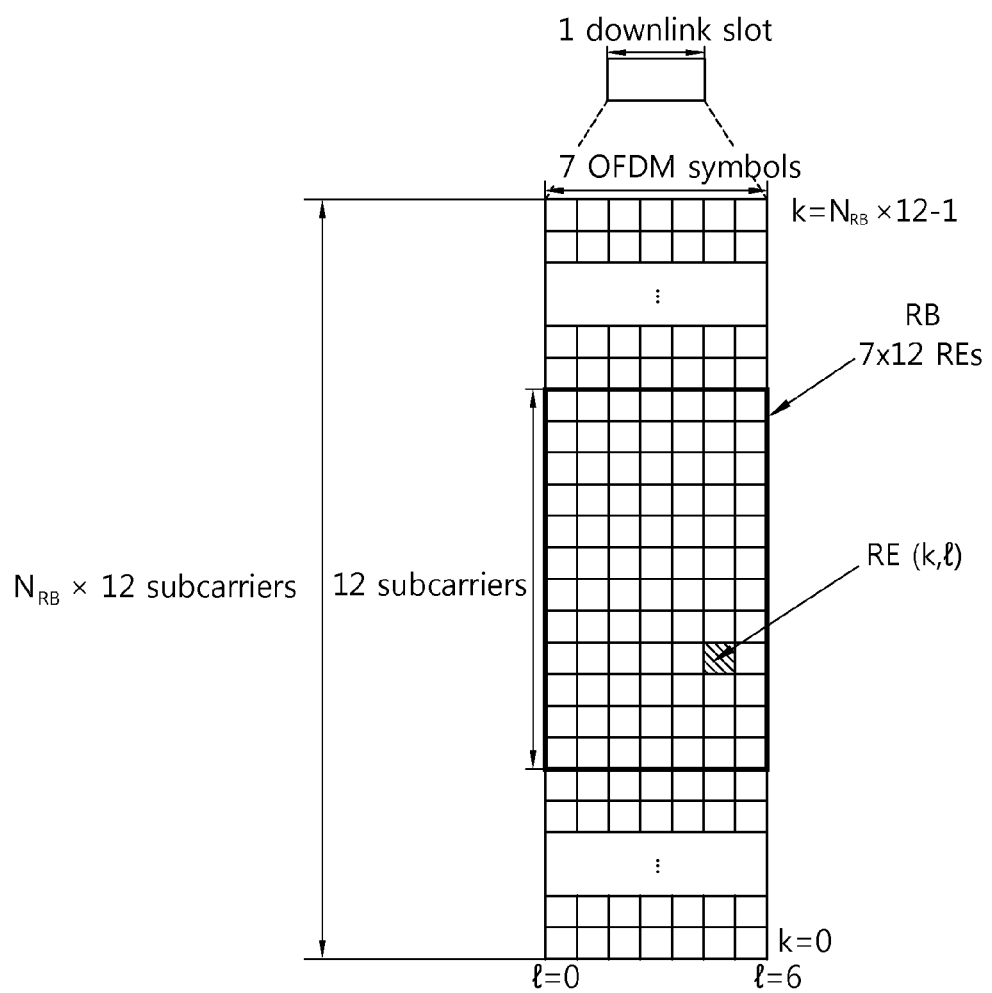
FIG. 2 illustrates an example of the resource grid of a single downlink slot.

FIG. 2 illustrates an example of the resource grid of a single downlink slot.

The downlink slot includes a plurality of OFDM symbols in a time domain and includes an $N_{RB}$ number of RBs in a frequency domain. The number of RBs $N_{RB}$ included in a downlink slot depends on a downlink transmission bandwidth configured in a cell. For example, in an LTE system, the number of RBs $N_{RB}$ may be any a single of 60 to 110. A single RB includes a plurality of subcarriers in a frequency domain. An uplink slot may have the same structure as the downlink slot.

Each element on the resource grid is referred to as a Resource Element (RE). The RE on the resource grid may be identified by an index pair (k,l) within a slot. In this case, k (k=0, . . . , $N_{RB} \times 12-1$) is a subcarrier index in a frequency domain, and l (l=0, . . . , 6) is an OFDM symbol index in a time domain.

In this case, a single RB is illustrated as including 7×12 REs, including 7 OFDM symbols in a time domain and 12 subcarriers in a frequency domain, but the number of OFDM symbols and the number of subcarriers within an RB are not limited thereto. The number of OFDM symbols and the number of subcarriers may be changed in various ways depending on the length of a CP, frequency spacing, etc.

Figure 3:
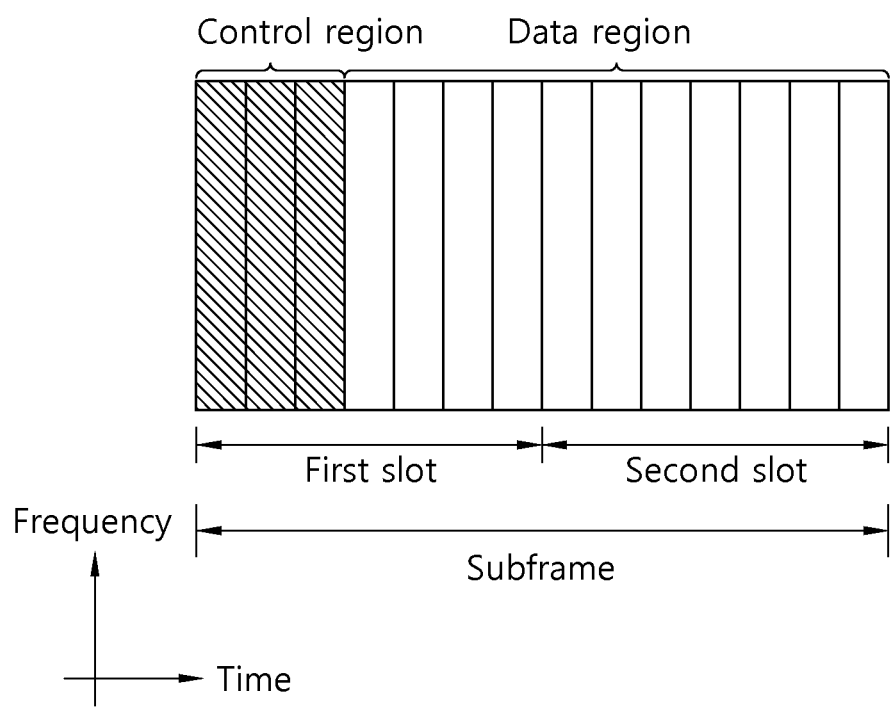
FIG. 3 illustrates the configuration of a downlink subframe.

FIG. 3 illustrates the configuration of a downlink subframe.

The downlink (DL) subframe is divided into a control region and a data region in a time domain. The control region includes a maximum of former 3 OFDM symbols in a first slot within the DL subframe, but the number of OFDM symbols included in the control region may be changed. Control channels different from a physical downlink control channel (PDCCH) are allocated to the control region, and PDSCHs are allocated to the data region.

As disclosed in 3GPP TS 36.211 V10.4.0, in 3GPP LTE/LTE-A, the control channel may include a PDCCH, a physical control format indicator channel (PCFICH), and a physical hybrid-ARQ indicator channel (PHICH).

A physical control format indicator channel (PCFICH) transmitted in the first OFDM symbol of a subframe carries a Control Format Indicator (CIF) indicative of the number of OFDM symbols (i.e., the size of a control region) used to transmit control channels within the subframe. UE may receive a CIF on a PCFICH and then monitor a PDCCH. The PCFICH is transmitted through the fixed PCFICH resources of the subframe without using blind decoding.

A PHICH carries positive-acknowledgement (ACK)/negative-acknowledgement (NACK) signals for a uplink Hybrid Automatic Repeat Request (HARQ). The ACK/NACK signal of uplink (UL) data on a PUSCH transmitted by UE is transmitted through a PHICH.

A PDCCH occupies a maximum of four OFDM symbols in the time domain and is transmitted over the entire system band in the frequency domain. Control information transmitted through a PDCCH is called Downlink Control Information (DCI). DCI may include information about the resource allocation of a PDSCH (this is also called a DL grant), the resource allocation of a PUSCH (this is also called an UL grant), a set of transmit power control commands for each UE within a specific UE group, and/or the activation of a Voice over Internet Protocol (VoIP).

A BS determines a PDCCH format based on DCI to be transmitted to UE, attaches a Cyclic Redundancy Check (CRC) to the DCI, and masks a unique identifier (this is also called a Radio Network Temporary Identifier (RNTI)) the CRC depending on the owner or use of a PDCCH.

If the PDCCH is a PDCCH for specific UE, an identifier unique to the UE, for example, a Cell-RNTI (C-RNTI) may be masked to the CRC. If the PDCCH is a PDCCH for a paging message, a paging instruction identifier, for example, a Paging-RNTI (P-RNTI) may be masked to the CRC. If the PDCCH is a PDCCH for a System Information Block (SIB), a system information identifier, for example, a System Information-RNTI (SI-RNTI) may be masked to the CRC. A Random Access-RNTI (RA-RNTI) may be masked to the CRC in order to indicate a random access response, that is, a response to the transmission of a random access preamble.

A control region within a subframe includes a plurality of Control Channel Elements (CCEs). The CCE is a logical allocation unit used to provide a PDCCH with a coding rate depending on the state of a radio channel, and the CCE corresponds to a plurality of Resource Element Groups (REGs). The REG includes a plurality of REs. The format of a PDCCH and the number of bits of an available PDCCH are determined depending on association between the number of CCEs and a coding rate provided by the CCEs.

A single REG includes 4 Res, and a single CCE includes 9 REGs. In order to configure a single PDCCH, $\{1, 2, 4, 8\}$ CCEs may be used. Each of the elements of $\{1, 2, 4, 8\}$ is called a CCE aggregation level.

The number of CCEs used to send a PDDCH is determined by a BS depending on a channel state. For example, UE having a good DL channel state may use a single CCE to send a PDCCH. UE having a poor DL channel state may use 8 CCEs to send a PDCCH.

A control channel including one or more CCEs is mapped to physical resources, after interleaving is performed in unit of an REG and cyclic shift based on a cell identifier (ID) is then performed.

Figure 4:
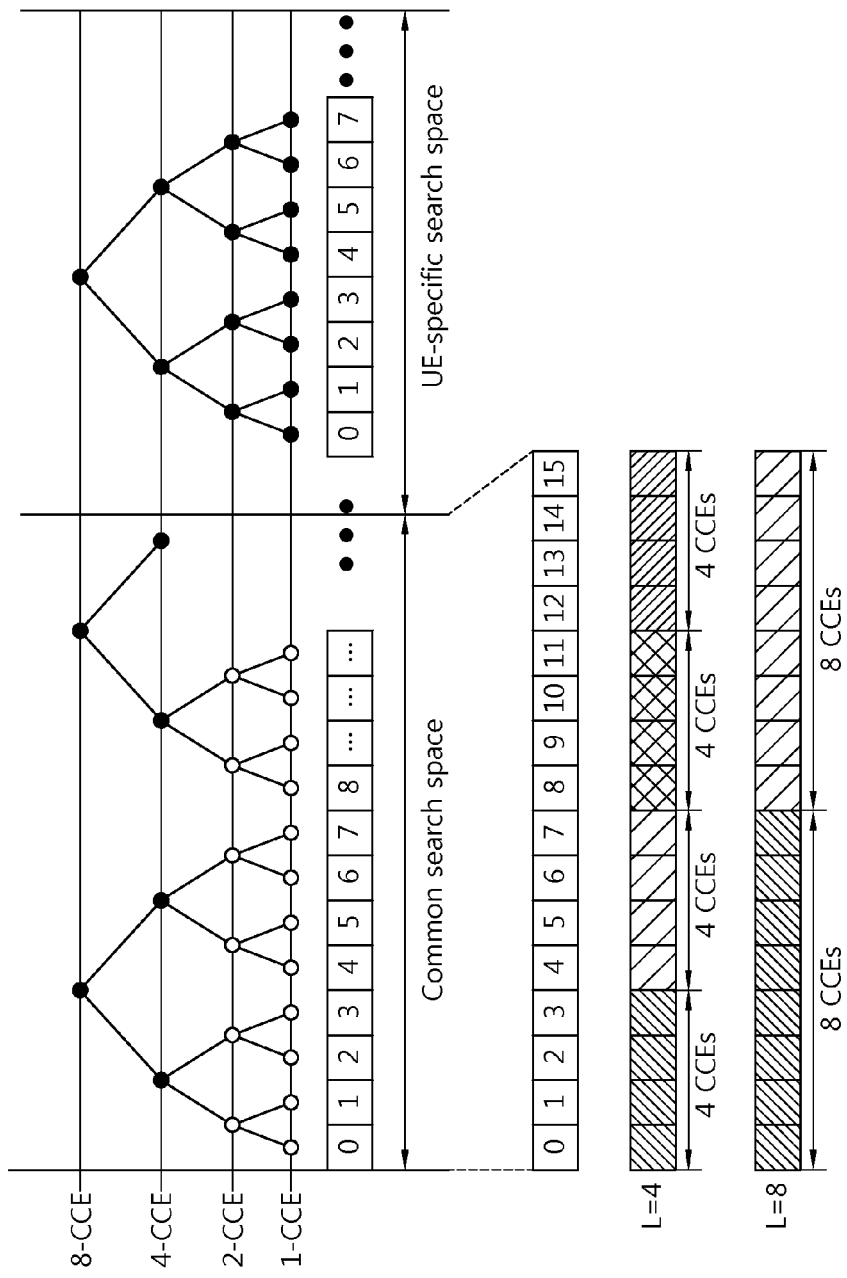
FIG. 4 is an exemplary diagram illustrating the monitoring of a physical downlink control channel (PDCCH).

FIG. 4 is an exemplary diagram illustrating the monitoring of a physical downlink control channel (PDCCH). For the monitoring of the PDCCH, reference may be made to Paragraph 9 of 3GPP TS 36.213 V10.4.0.

UE is unable to know that its own PDCCH is transmitted using what CCE aggregation level or what DCI format in which place within a control region. Since a plurality of PDCCHs may be transmitted within a single subframe, UE monitors the plurality of PDCCHs for every subframe. In this case, the term 'monitoring' means that the UE attempts to decode the PDCCH depending on a PDCCH format.

In 3GPP LTE, in order to reduce a load resulting from blind decoding, a search space is used. The search space may be called a monitoring set of CCEs for a PDCCH. UE monitors a PDCCH within a search space.

A search space is divided into a common search space and a UE-specific search space. The common search space is a space where a PDCCH having common control information is searched for. The common search space includes 16 CCEs having a CCE index 0 to a CCE index 15 and supports a PDCCH having a $\{4, 8\}$ CCE aggregation level. However, a PDCCH (DCI formats 0 and 1A) that carries UE-specific information may also be transmitted in the common search space. The UE-specific search space supports a PDCCH having a $\{1, 2, 4, 8\}$ CCE aggregation level.

Table 1 below indicates the number of PDCCH candidates monitored by UE.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The size of a search space is defined in Table 1, and the start point of the search space is differently defined in a common search space and a UE-specific search space. A start point of the common search space is fixed irrespective of a subframe, whereas a start point of the UE-specific search space may be different in each subframe depending on a UE identifier (e.g., C-RNTI), a CCE aggregation level and/or a slot number within a radio frame. If the start point of a UE-specific search space is within a common search space, the UE-specific search space and the common search space may overlap with each other.

In an aggregation level $L \in \{1,2,4,8\}$, a search space $S^{(L)}_k$ is defined as a set of PDCCH candidates. A CCE corresponding to the PDCCH candidates m of the search space $S^{(L)}_k$ is given as follows.

$$L \cdot \{(Y_k + m') \bmod \lfloor N_{CCE,k}/L \rfloor\} + i \qquad \text{[Equation 1]}$$

In Equation 1, $i=0, 1, \ldots, L-1, m=0, \ldots, M^{(L)}-1$, and $N_{CCE,k}$ is a total number of CCEs that may be used to send a PDCCH within a control region of a subframe k. The control region includes a set of CCEs numbered from 0 to $N_{CCE,k}-1$. $M^{(L)}$ is the number of PDCCH candidates in a CCE aggregation level L in a given search space.

If a Carrier Indicator Field (CIF) is set in UE, $m'=m+M^{(L)}n_{CIF}$. $n_{CIF}$ is a value of the CIF. F a CIF is not set in UE, $m'=m$.

In a common search space, $Y_k$ is set to 2 aggregation levels and is set to 0 in relation to L=4 and L=8.

In a UE-specific search space having an aggregation level L, a parameter $Y_k$ is defined as follows.

$$Y_k = (A \cdot Y_{k-1}) \bmod D \qquad \text{[Equation 2]}$$

In Equation 2, $Y_{-1} = n_{RNTI} \neq 0, A=39827, D=65537, k=\text{floor}(n_s/2)$, and $n_s$ is a slot number within a radio frame.

When UE monitors a PDCCH based on a C-RNTI, a DCI format and a search space to be monitored are determined depending on transmission mode of a PDSCH. The following table shows an example of the monitoring of a PDCCH in which a C-RNTI is set.

TABLE 2

| TRANS-MISSION MODE | DCI FORMAT | SEARCH SPACE | TRANSMISSION MODE OF PDSCH ACCORDING TO PDCCH |
|---|---|---|---|
| Mode 1 | DCI format 1A | common and UE-specific | Single antenna port, port 0 |
|  | DCI format 1 | UE-specific | Single antenna port, port 0 |
| Mode 2 | DCI format 1A | common and UE-specific | Transmit diversity |
|  | DCI format 1 | UE-specific | Transmit diversity |
| Mode 3 | DCI format 1A | common and UE-specific | Transmit diversity |
|  | DCI format 2A | UE-specific | Cyclic Delay Diversity (CDD) or transmit diversity |
| Mode 4 | DCI format 1A | common and UE-specific | Transmit diversity |
|  | DCI format 2 | UE-specific | Closed-loop spatial multiplexing |
| Mode 5 | DCI format 1A | common and UE-specific | Transmit diversity |
|  | DCI format 1D | UE-specific | Multi-user Multiple Input Multiple Output (MU-MIMO) |
| Mode 6 | DCI format 1A | common and UE-specific | Transmit diversity |
|  | DCI format 1B | UE-specific | Closed-loop spatial multiplexing |
| Mode 7 | DCI format 1A | common and UE-specific | If the number of PBCH transmission ports is 1, single antenna port, port 0, and if not, transmit diversity |
|  | DCI format 1 | UE-specific | a single antenna port, port 5 |
| Mode 8 | DCI format 1A | common and UE-specific | If the number of PBCH transmission ports is 1, single antenna port, port 0, and if not, transmit diversity |
|  | DCI format 2B | UE-specific | Dual layer transmission (port 7 or 8), or a single antenna port, port 7 or 8 |

The uses of the DCI formats are divided as in the following table.

TABLE 3

| DCI FORMAT | CONTENTS |
|---|---|
| DCI format 0 | Used for PUSCH scheduling |
| DCI format 1 | Used for the scheduling of a single PDSCH codeword |
| DCI format 1A | Used for compact scheduling and a random access process of a single PDSCH codeword |
| DCI format 1B | Used for the compact scheduling of a single PDSCH codeword having preceding information |
| DCI format 1C | Used for the very compact scheduling of a single PDSCH codeword |
| DCI format 1D | Used for the preceding and compact scheduling of a single PDSCH codeword having power offset information |
| DCI format 2 | Used for the PDSCH scheduling of MSs set in closed-loop spatial multiplexing mode |
| DCI format 2A | Used for the PDSCH scheduling set in open-loop spatial multiplexing mode |
| DCI format 3 | Used to send a TPC command for a PUCCH and a PUSCH having 2-bit power adjustments |
| DCI format 3A | Used to send a TPC command for a PUCCH and a PUSCH having 1-bit power adjustment |

Figure 5:
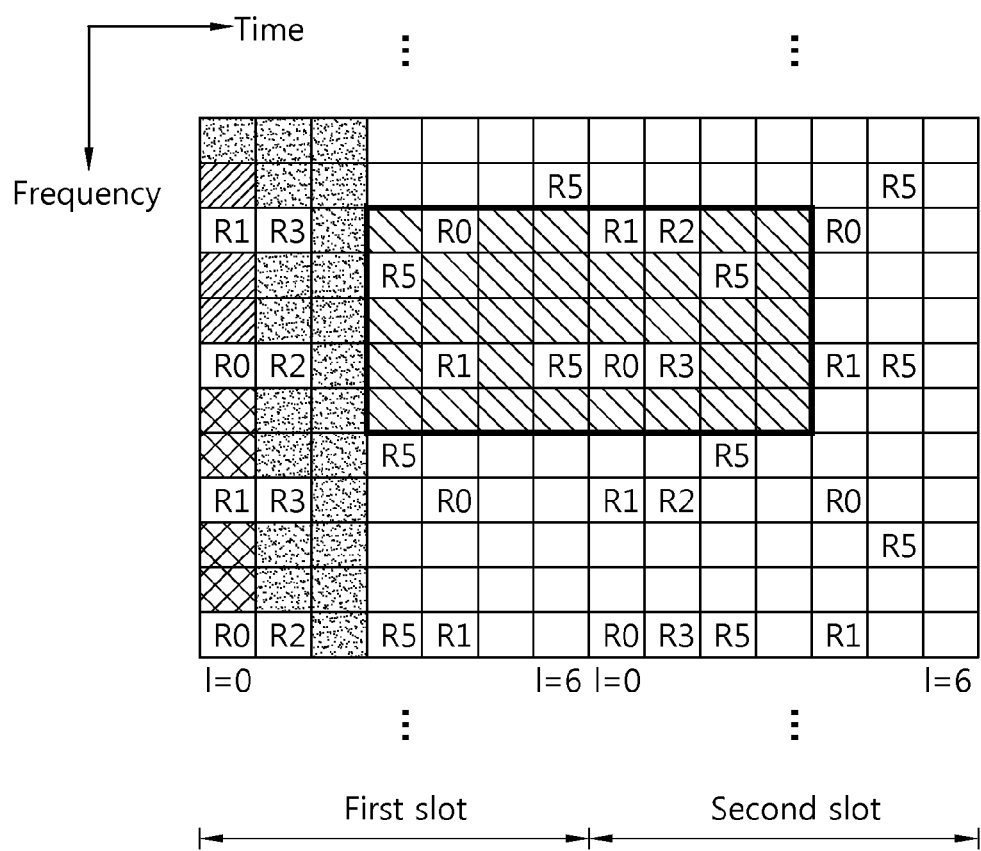
FIG. 5 illustrates an example in which reference signals and control channels are disposed in a downlink subframe of 3GPP LTE.

FIG. 5 illustrates an example in which reference signals (RSs) and control channels are disposed in a downlink subframe of 3GPP LTE.

A control region includes former 3 OFDM symbols, and a data region in which a PDSCH is transmitted includes the remaining OFDM symbols.

A Physical Control Format Indicator Channel (PCFICH), a Physical Hybrid-ARQ Indicator Channel (PHICH) and/or a PDCCH are transmitted in the control region. The CFI of the PCFICH indicates the 3 OFDM symbols. A region of the control region other than resources through which the PCFICH and/or the PHICH are transmitted becomes a PDCCH region in which a PDCCH is monitored.

Furthermore, various types of reference signals are also transmitted in the DL subframe.

A Cell-specific Reference Signal (CRS) may be received by all pieces of UEs within a cell and is transmitted over the entire DL band. In FIG. 5, 'R0' is a Resource Element (RE) in which the CRS of a first antenna port is transmitted, 'R1' is an RE in which the CRS of a second antenna port is transmitted, 'R2' is an RE in which the CRS of a third antenna port is transmitted, and 'R3' is an RE in which the CRS of a fourth antenna port is transmitted.

An RS sequence $r_{l,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

In Equation 3, $m=0, 1, \ldots, 2N_{maxRB}-1$, $N_{maxRB}$ is a maximum number of RBs, ns is a slot number within a radio frame, and l is an OFDM symbol number within a slot.

A pseudo-random sequence c(i) is defined by the following gold sequence having a length of 31.

$$c(n)=(x_1(n+Nc)+x_2(n+Nc))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 4]}$$

In Equation 4, Nc=1600, and a first m-sequence is initialized to $x_1(0)=1$, $x_1(n)=0$, $m=1, 2, \ldots, 30$.

A second m-sequence is initialized to $c_{init}=2^{10}(7(ns+1)+l+1)(2N^{cell}_{ID}+1)+2N^{cell}_{ID}+N_{CP}$ at the start of each OFDM symbol. $N^{cell}_{ID}$ is the Physical Cell Identity (PCI) of a cell. $N_{CP}=1$ in a normal CP, and $N_{CP}=0$ in an extended CP.

Furthermore, a UE-specific Reference Signal (URS) may be transmitted. A CRS is transmitted in the entire region of a subframe, whereas an URS is transmitted within the data region of a subframe and used to demodulate a PDSCH. In FIG. 5, 'R5' indicates an RE in which an URS is transmitted. The URS is also called a Dedicated Reference Signal (DRS) or a Demodulation Reference Signal (DM-RS).

The URS is transmitted only in an RB to which a corresponding PDSCH is mapped. In FIG. 5, although R5 is indicated in regions other than a region in which a PDSCH is transmitted, this is for indicating the location of an RE to which an URS is mapped.

The URS is used by only UE that receives a corresponding PDSCH. An RS sequence $r_{ns}(m)$ for US is given in Equation 3. In this case, $m=0, 1, \ldots, 12N_{PDSCH,RB}-1$, and $N_{PDSCH,RB}$ is the number of RBs used to send a corresponding PDSCH. A pseudo-random sequence generator is initialized to $c_{init}=(\text{floor}(ns/2)+1)(2N^{cell}_{ID}+1)2^{16}+n_{RNTI}$ at the start of each subframe. $n_{RNTI}$ is the identifier of UE.

An URS may be transmitted through a single antenna, but may be transmitted through multiple antennas. If an URS is transmitted through multiple antennas, a pseudo-random sequence generator is initialized to $c_{init}=(\text{floor}(ns/2)+1)$ $(2N^{cell}_{ID}+1)2^{16}+n_{SCID}$ at the start of each subframe. $n_{SCID}$ is a parameter obtained from a DL grant (e.g., DCI format 2B or 2C) related to PDSCH transmission.

An URS supports Multiple Input Multiple Output (MIMO) transmission. An RS sequence for an URS may be spread as the following spread sequence depending on an antenna port or a layer.

TABLE 4

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

A layer may be defined as an information path to a precoder. A rank is the number of non-zero eigenvalues of an MIMIO channel matrix and is equal to the number of layers or the number of spatial streams. A layer may correspond to an antenna port for classifying URSs and/or a spread sequence applied to an URS.

Meanwhile, a PDCCH is monitored in a limited region called a control region within a subframe, and a CRS transmitted in all bands is used in a PDCCH in order to demodulate the PDCCH. As the type of control information is diversified and the amount of control information is increased, the flexibility of scheduling using only an existing PDCCH is low. Furthermore, in order to reduce a load due to CRS transmission, an enhanced physical downlink control channel (ePDCCH) is being introduced.

Figure 6:
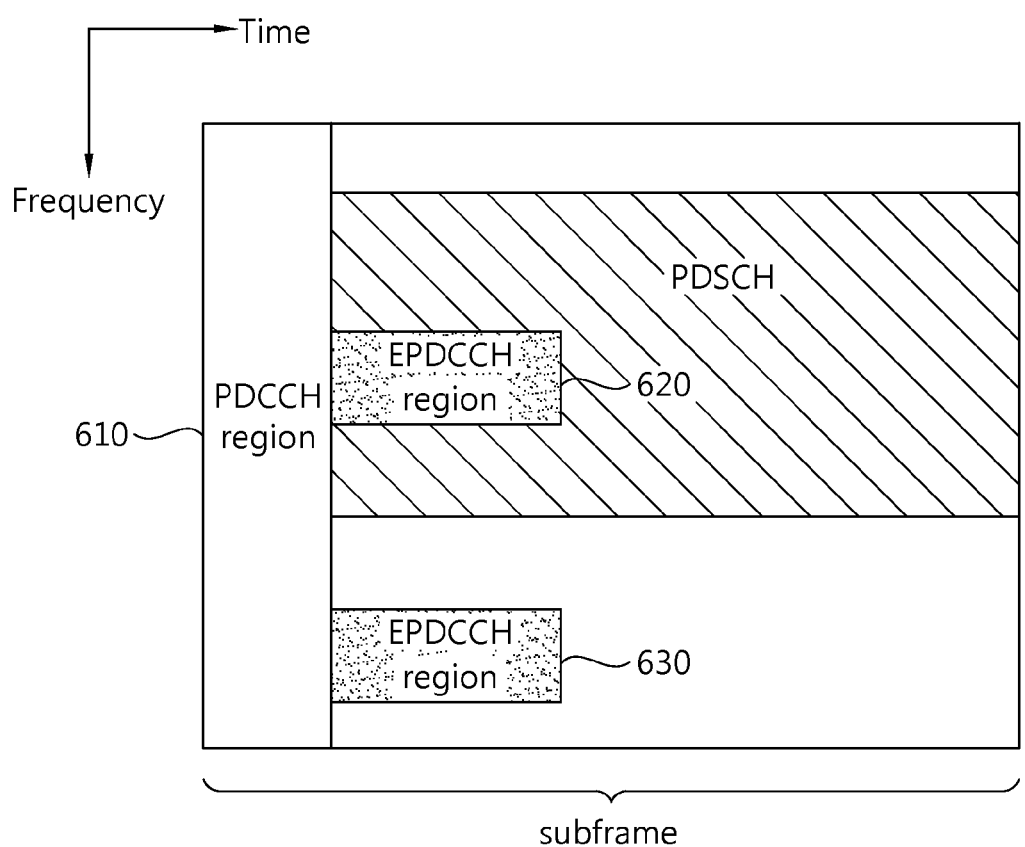
FIG. 6 is an example of a subframe having an enhanced PDCCH (ePDCCH).

FIG. 6 is an example of a subframe having an enhanced PDCCH (ePDCCH).

The subframe may include 0 or a single PDCCH region 610 and 0 or more ePDCCH regions 620 and 630.

UE monitors an ePDCCH in the ePDCCH regions 620 and 630. The PDCCH region 610 is located within former 4 OFDM symbols within a subframe, whereas the ePDCCH regions 620 and 630 may be flexibly scheduled in OFDM symbols after the PDCCH region 610.

One or more ePDCCH regions 620 and 630 may be assigned to UE, and the UE may monitor an ePDCCH in the assigned ePDCCH regions 620 and 630.

A BS may inform UE of information about the number/location/size of the ePDCCH regions 620 and 630 and/or a subframe in which an ePDCCH will be monitored through an RRC message.

In the PDCCH region 610, a PDCCH may be demodulated based on a CRS. In the ePDCCH regions 620 and 630, a demodulation (DM) RS not a CRS may be defined in order to demodulate an ePDCCH. A corresponding DM RS may be transmitted in corresponding ePDCCH regions 620 and 630.

An RS sequence $r_{ns}(m)$ for a DM RS is the same as Equation 3. In this case, $m=0, 1, \ldots, 12N_{RB}-1$, and $N_{RB}$ is a maximum number of RBs. A pseudo-random sequence generator may be initialized to $c_{init}=(\text{floor}(ns/2)+1)(2N_{ePDCCH,ID}+1)2^{16}+n_{ePDCCH,SCID}$ at the start of each subframe. ns is a slot number within a radio frame, $N_{ePDCCH,ID}$ is a cell index related to a corresponding ePDCCH region, and $n_{ePDDCH,SCID}$ is a parameter given from higher layer signaling.

Each of the ePDCCH regions 620 and 630 may be used in scheduling for a different cell. For example, an ePDCCH within the ePDCCH region 620 may carry scheduling information for a first cell, and an ePDCCH within the ePDCCH region 630 may carry scheduling information for a second cell.

When an ePDCCH is transmitted through multiple antennas in the ePDCCH regions 620 and 630, the same precoding as that of an ePDCCH may be applied to DM RSs within the ePDCCH regions 620 and 630.

If a PDCCH uses a CCE as a transmission resource unit, a transmission resource unit for an ePDCCH is called an enhanced Control Channel Element (eCCE). An aggregation level may be defined as a resource unit for monitoring an ePDCCH. For example, assuming that 1 eCCE is a minimum resource for an ePDCCH, an aggregation level L={1, 2, 4, 8, 16} may be defined.

Hereinafter, an ePDCCH search space may correspond to an ePDCCH region. One or more ePDCCH candidates may be monitored in the ePDCCH search space every one or more aggregation levels.

Resource allocation for an ePDCCH is described below.

An ePDCCH is transmitted using one or more eCCEs. An eCCE includes a plurality of enhanced Resource Element Groups (eREGs). An eCCE may include 4 eREGs or 8 eREGs depending on the type and CP of a subframe. For example, an eCCE may include 4 eREGs in a normal CP, and an eCCE may include 8 eREGs in an extended CP.

A Physical Resource Block (PRB) pair refers to two PRBs having the same RB number in a single subframe. That is, a PRB pair refers to the first PRB of a first slot and the second PRB of a second slot in the same frequency domain. In a normal CP, a PRB pair includes 14 OFDM symbols and 12 subcarriers.

Figure 7:
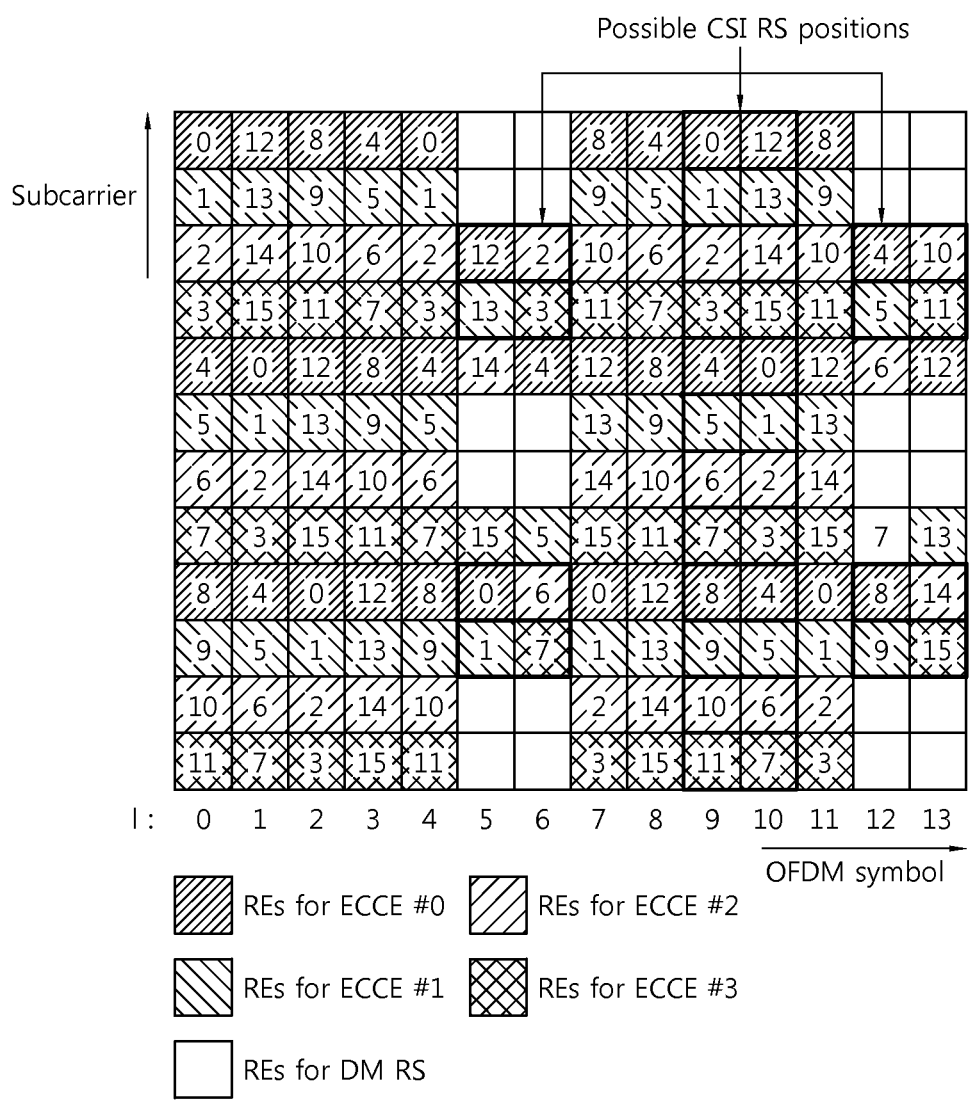
FIG. 7 illustrates an example of a Physical Resource Block (PRB) pair.

FIG. 7 illustrates an example of a Physical Resource Block (PRB) pair. Each PRB is hereinafter assumed to include 7 OFDM symbols and 12 subcarriers, but the number of OFDM symbols and the number of subcarriers are only exemplary.

In a single subframe, a PRB pair includes 168 REs. 16 eREGs are formed using 144 REs other than 24 REs for DM-RSs. That is, a single eREG may include 9 REs. In this case, a CSI-RS or a CRS may be disposed in a single PRB pair in addition to the DM-RSs. In such a case, since the number of available REs is reduced, the number of REs included in a single eREG may also be reduced. The number of REs included in an eREG may be changed, but the number of eREGs included in a single PRB pair is not changed.

As illustrated in FIG. 7, RE indices may be sequentially assigned from the first subcarrier of a first OFDM symbols (l=0). It is assumed that indices of 0 to 15 are assigned to 16 eREGs. In this case, 9 REs having the RE index 0 is allocated to the eREG 0. Likewise, 9 REs corresponding to an RE index k (k=0, . . . , 15) are allocated to an eREG k.

An eREG is defined by grouping a plurality of eREGs. For example, if an eREG having 4 eREGs is defined, an eREG #0={an eREG 0, an eREG 4, an eREG 8, an eREG 12}, an eREG #1={an eREG 1, an eREG 5, an eREG 9, an eREG 3}, an eREG #2={an eREG 2, an eREG 6, an eREG 10, an eREG 14}, and an eREG #3={an eREG 3, an eREG 7, an eREG 11, an eREG 15} may be defined. If an eREG having 8 eREGs is defined, an eREG #0={an eREG 0, an eREG 2, an eREG 4, an eREG 6, an eREG 8, an eREG 10, an eREG 12, an eREG 14}, and an eREG #1={an eREG 1, an eREG 3, an eREG 5, an eREG 7, an eREG 9, an eREG 11, an eREG 13, an eREG 15} may be defined.

As described above, an eCCE may include 4 eREGs in a normal CP, and an eCCE may include 8 eREGs in an extended CP. The eCCE is defined by an eREG. For example, FIG. 7 illustrates that an eCCE #0 includes an eREG #0, an eCCE #1 includes an eREG #1, an eCCE #2 includes an eREG #2, and an eCCE #3 includes an eREG #3.

eCCE-to-eREG mapping includes two types: localized transmission and distributed transmission. In the localized transmission, an eREG that forms a single eCCE is selected from an eREG within a single PRB pair. In the distributed transmission, an eREG that forms a single eCCE is selected from an eREG from different PRB pairs.

The number of REs that forms an eCCE may be changed every eCCE because the number of REs belonging to an eREG may be changed as described above. For example, a CSI-RS may be transmitted in an OFDM symbol having l=9, 10. 2 REs are excluded from which eCCE, but 1 RE may be excluded from which eCCE, resulting in the irregularity of the number of Res between the eCCEs. A cyclic shift of an RE index is taken into consideration in order to reduce the irregularity of the number of REs allocated to an eCCE.

Figure 8:
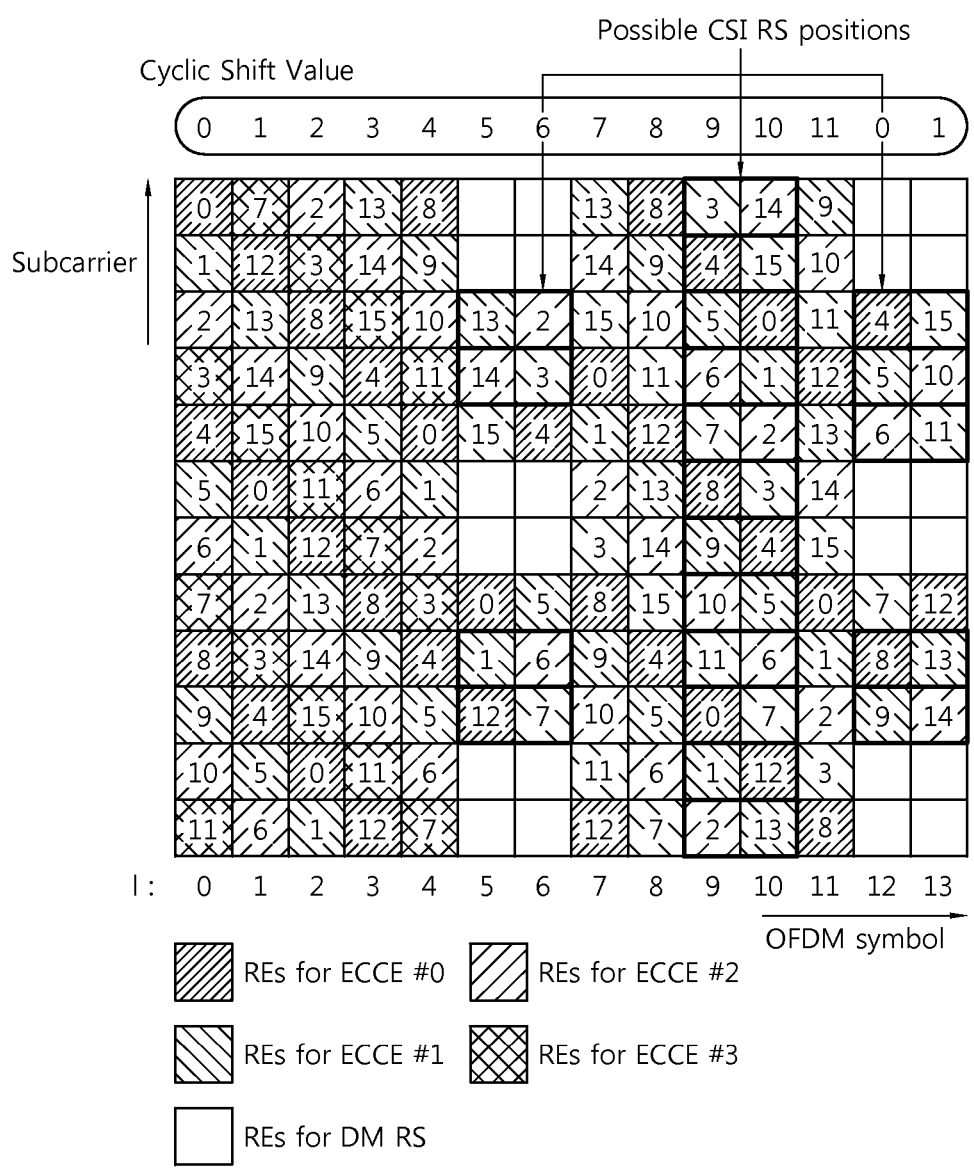
FIG. 8 illustrates an example of a PRB pair to which a cyclic shift has been applied.

FIG. 8 illustrates an example of a PRB pair to which a cyclic shift has been applied.

In the RE index deployment of FIG. 8, the indices of REs belonging to the same OFDM symbol have been shifted by a cyclic shift value. For example, an RE index is subjected to a cyclic shift by 1 in an OFDM symbol having an index l=1, and an RE index is subjected to a cyclic shift by 2 in an OFDM symbol having an index l=2. Such a cyclic shift value is only exemplary.

A cyclic shift value may be given based on the index of an OFDM symbol.

Figure 9:
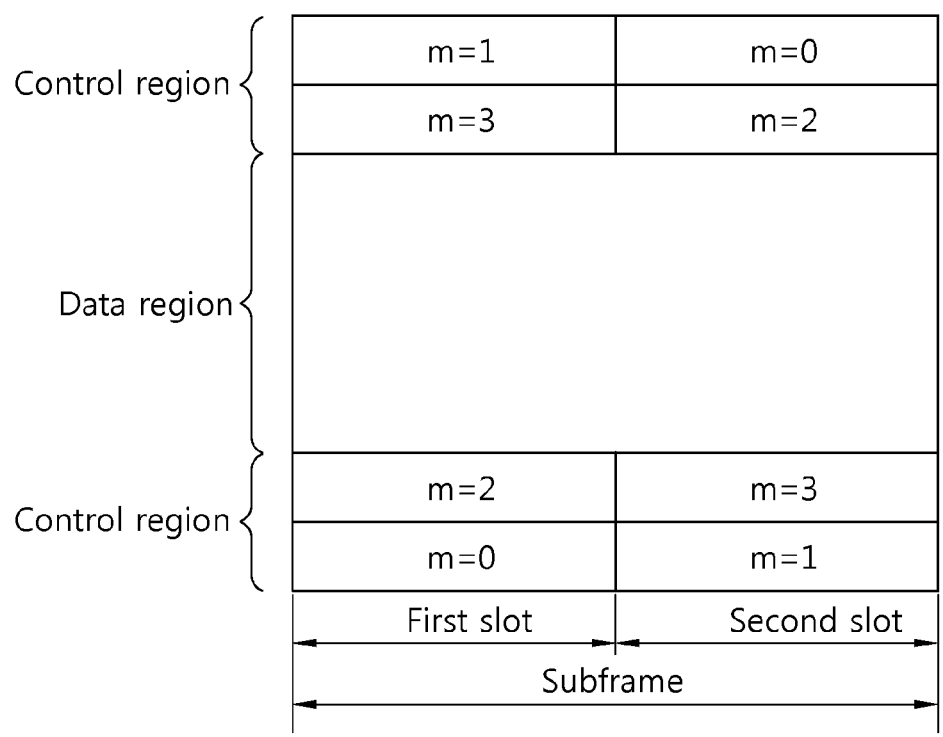
FIG. 9 illustrates the structure of an uplink subframe.

FIG. 9 illustrates the structure of an uplink subframe.

The uplink subframe may be divided into a control region and a data region in a frequency domain. Physical uplink control channels (PUCCHs) on which uplink control information is transmitted are allocated to the control region. Physical uplink shared channels (PUSCHs) on which data is transmitted are allocated to the data region.

A PUCCH for a single piece of UE is allocated in the form of a single PRB pair in an subframe. RBs belonging to a single PRB pair occupy different subcarriers in a first slot and a second slot. A frequency occupied by RBs that belong to an RB pair allocated to a PUCCH is changed based on a slot boundary. This is said that a PRB pair allocated to a PUCCH has been frequency-hopped at the slot boundary. UE may obtain a frequency diversity gain by sending uplink control information through different subcarriers over time. m is a location index indicative of the logical frequency domain location of an RB pair allocated to a PUCCH in a subframe.

Uplink control information transmitted on a PUCCH includes Hybrid Automatic Repeat Request (HARQ) acknowledgement (ACK), a Channel Quality Indicator indicative of a DL channel state, and a Scheduling Request that is an uplink radio resource allocation request.

Meanwhile, a demand for a high data transfer rate is increased, and thus a Carrier Aggregation (CA) supporting a plurality of cells may be applied in 3GPP LTE-A. A CA may also be called another term, such as a bandwidth aggregation. A CA means that a wireless communication system forms a broadband by collecting one or more carriers each having a bandwidth smaller than a broadband, that is, a target, when trying to support the broadband. Carriers, that is, a target, when one or more carriers are collected, may use bandwidths used in an existing system for the purpose of backward compatibility with the existing system. For example, in 3GPP LTE, bandwidths, such as 1.4 MHz, 3 MHz, 5 MHz, 10 MHz, 15 MHz, and 20 MHz, may be supported. In 3GPP LTE-A, a broadband of 20 MHz or higher may be configured using only the bandwidths of a 3GPP LTE system. Alternatively, new bandwidths may be defined without using the bandwidths of existing systems, and a broadband may be configured using the new bandwidths.

A plurality of BSs and a plurality of pieces of UE may communicate with each other through a maximum of 5 cells. The 5 cells may correspond to a bandwidth of a maximum of 100 MHz. That is, a CA environment indicates that specific UE has two or more configured serving cells (hereinafter called cells) having different carrier frequencies. The carrier frequency indicates the center frequency of a cell.

A cell indicates a combination of DL resources and UL resources optionally. That is, a cell must include DL resources and may optionally include UL resources combined with the DL resources. The DL resource may be a DL Component Carrier (CC). The UL resource may be an UL CC. If specific UE has a single configured serving cell, it may have a single DL CC and a single UL CC. If specific UE has two or more cells, it may have DL CCs equal to the number of cells and UL CCs smaller than or equal to the number of cells. That is, if a CA is supported in current 3GPP LTE-A, the number of DL CCs may be always greater than or equal to the number of UL CCs. In contrast, releases subsequent to 3GPP LTE-A, a CA in which the number of DL CCs is smaller than the number of UL CCs may be supported.

Linkage between the carrier frequency of a DL CC and the carrier frequency of an UL CC may be indicated by system information transmitted on a DL CC. The system information may be System Information Block type2 (SIB2).

Figure 10:
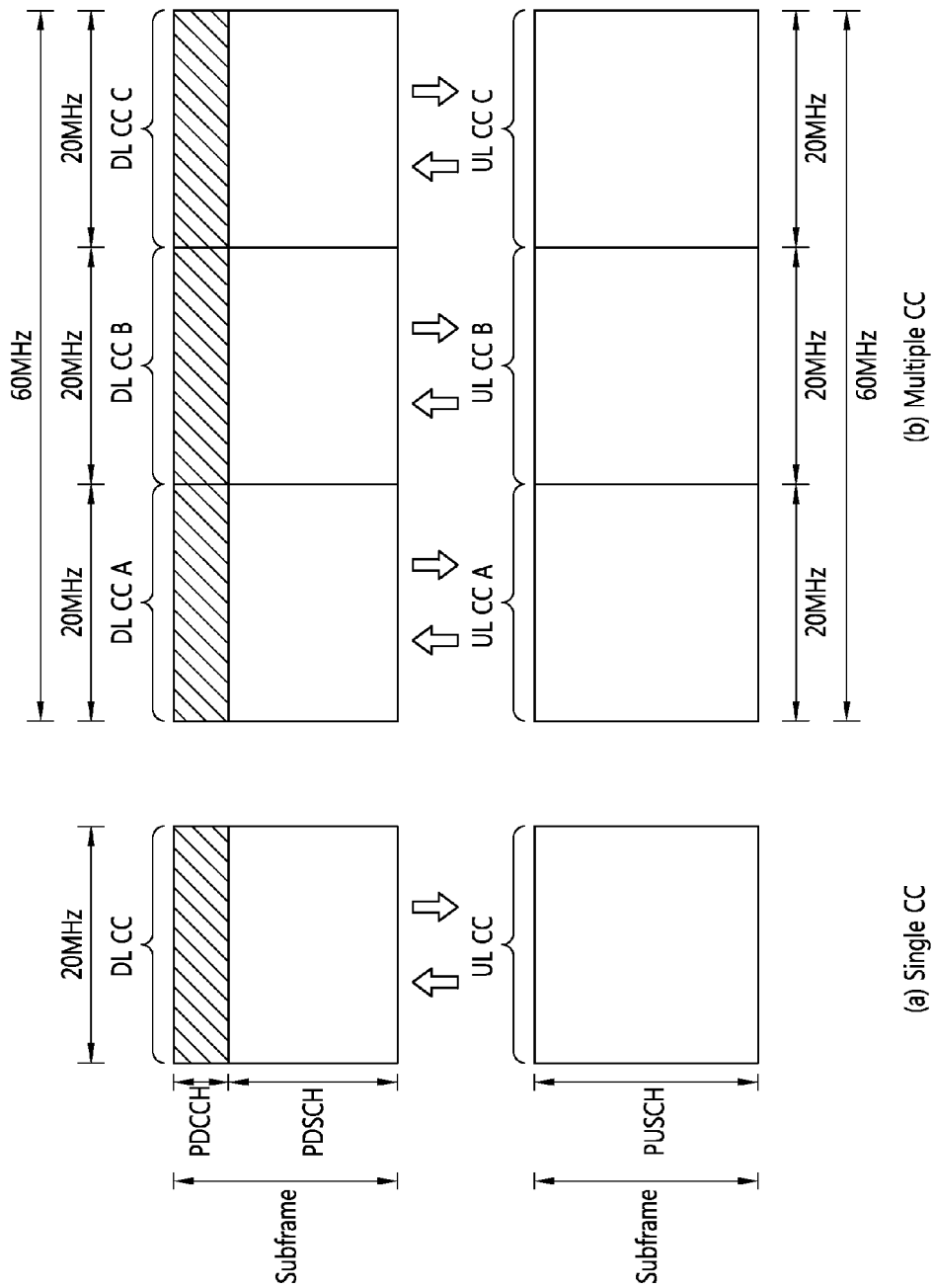
FIG. 10 illustrates an example of the structure of the subframes of a single carrier system and a carrier aggregation system.

FIG. 10 illustrates an example of the structure of the subframes of a single carrier system and a carrier aggregation system.

FIG. 10-(a) illustrates a single carrier system. A system bandwidth of FIG. 10-(a) is assumed to be 20 MHz. Since the number of carriers is 1, each of the bandwidth of a DL CC transmitted by a BS and the bandwidth of an UL CC transmitted by UE is 20 MHz. The BS performs DL transmission through the DL CC, and the UE performs UL transmission through the UL CC.

FIG. 10-(b) illustrates a carrier aggregation system. A system bandwidth of FIG. 10-(b) is assumed to be 60 MHz. A downlink bandwidth includes a DL CC A, a DL CC B, and a DL CC C each having a bandwidth of 20 MHz. An uplink bandwidth includes an UL CC A, an UL CC B, and an UL CC C each having a bandwidth of 20 MHz. A BS performs DL transmission through the DL CC A, the DL CC B, and the DL CC C, and UE performs UL transmission through the UL CC A, the UL CC B, and the UL CC C. The DL CC A and the UL CC A, the DL CC B and the UL CC B, and the DL CC C and the UL CC C may correspond to each other.

UE may monitor and/or receive a DL signal and/or data, transmitted through a plurality of DL CCs, at the same time. Although a cell manages N DL CCs, a BS may configure M DL CCs in cell-specific or UE-specific way so that UE monitors only a DL signal and/or data transmitted through the M DL CCs less than the N DL CCs. Furthermore, a BS may configure L DL CCs in a cell-specific way or UE-specific way so that UE preferentially monitors a DL signal and/or data, transmitted through the L DL CCs of M DL CCs.

UE supporting a CA may use a Primary cell (PCell) and one or more Secondary cells (SCell) for an increased bandwidth. That is, if two or more cells are present, a single cell becomes a PCell, and the remaining cells become SCells. Both the PCell and the SCell may become serving cells. UE in the RRC_CONNECTED state which does not support or cannot support a CA may have only a single serving cell including a PCell. UE in the RRC_CONNECTED state which supports a CA may have one or more serving cells including a PCell and all SCells.

A PCell may be a cell that operates in a primary frequency. A PCell may be a cell on which UE performs Radio Resource Control (RRC) connection with a network. A PCell may be a cell having the smallest cell index. A PCell may be a cell on which UE first attempts random access through a Physical Random Access Channel (PRACH), of a plurality of cells. A PCell may be a cell on which UE performs an initial connection establishment process or a connection re-establishment process in a CA environment. Alternatively, a PCell may be a cell indicated in a handover process. UE may obtain Non-Access Stratum (NAS) mobility information (e.g., a Tracking Area Indicator (TAI)) when performing RRC connection/reconfiguration/handover through a PCell. Furthermore, UE may obtain security input when performing RRC reconfiguration/handover through a PCell. UE may receive and send a PUCCH assigned thereto only in a PCell. Furthermore, UE may apply system information acquisition and system information change monitoring to only a PCell. A network may change the PCell of UE which supports a CA in a handover process using an RRCConnectionReconfiguration message including MobilityControlInfo.

An SCell may be a cell that operates in a secondary frequency. An SCell is used to provide additional radio resources. A PUCCH is not allocated to an SCell. When adding SCells, a network provides system information about a corresponding cell to UE in the RRC_CONNECTED state through dedicated signaling. A change of system information with respect to an SCell may be performed by the release and addition of a cell. A network may add, remove, or modify an SCell independently through an RRC connection re-establishment process using an RRCConnectionReconfiguration message.

LTE-A UE supporting a CA may send or receive one CC or a plurality of CCs at the same time depending on its capacity. LTE rel-8 UE may send or receive only a single CC when each of CCs forming a CA is compatible with an LTE rel-8 system. Accordingly, if the number of CCs used in uplink is at least the same as the number of CCs used in downlink, all the CCs need to be configured to be compatible with LTE rel-8. Furthermore, in order to efficiently use a plurality of CCs, the plurality of CCs may be managed in Media Access Control (MAC). If a CA is configured in DL, a receiver within UE needs to be able to receive a plurality of DL CCs. If a CA is configured in UL, a transmitter within UE needs to be able to send a plurality of UL CCs.

As a CA environment is introduced, cross-carrier scheduling may be applied. A PDCCH on a specific DL CC may schedule a PDSCH on any one of a plurality of DL CCs or schedule a PUSCH on any one of a plurality of UL CCs through cross-carrier scheduling. For cross-carrier scheduling, a Carrier Indicator Field (CIF) may be defined. A CIF may be included in a DCI format transmitted on a PDCCH. Whether or not the CIF is present in the DCI format may be indicated by an upper layer semi-statically or in a UE-specific way. When cross-carrier scheduling is performed, a CIF may indicate a DL CC on which a PDSCH is scheduled or an UL CC on which a PUSCH is scheduled. The CIF may have fixed 3 bits and may be present at a fixed location irrespective of the size of a DCI format. If a CIF is not present in a DCI format, a PDCCH on a specific DL CC may schedule PDSCHs on the same DL CC or schedule a PUSCH on an UL CC connected to the specific DL CC through SIB2.

If cross-carrier scheduling is performed using a CIF, a BS may assign a PDCCH monitoring DL CC aggregation in order to reduce the complexity of blind decoding by UE. The PDCCH monitoring DL CC aggregation is some of all DL CCs, and UE performs blind decoding on only PDCCHs within the PDCCH monitoring DL CC aggregation. That is, in order to schedule a PDSCH and/or a PUSCH in relation to the UE, a BS may send a PDCCH through only a DL CC within the PDCCH monitoring DL CC aggregation. The PDCCH monitoring DL CC aggregation may be configured in a UE-specific way, a UE group-specific way, or a cell-specific way.

Figure 11:
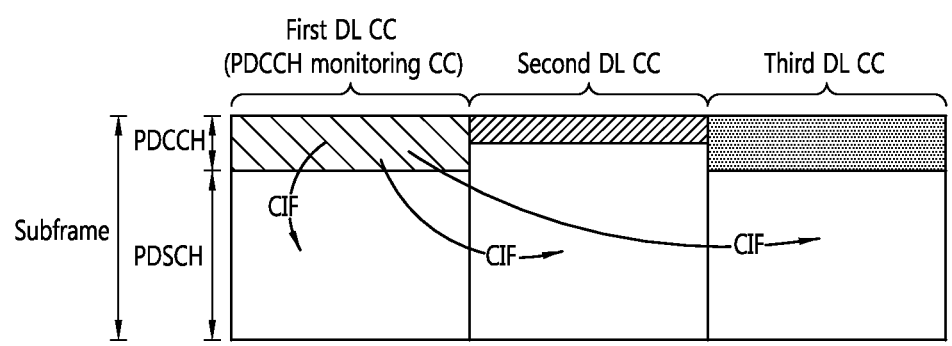
FIG. 11 illustrates an example of the subframe structure of a 3GPP LTE-advanced (A) system that is subjected to cross-carrier scheduling through a carrier indicator field.

FIG. 11 illustrates an example of the subframe structure of a 3GPP LTE-advanced (A) system that is subjected to cross-carrier scheduling through a carrier indicator field.

Referring to FIG. 11, the first DL CC of 3 DL CCs is configured as a PDCCH monitoring DL CC. If cross-carrier scheduling is not performed, each of the DL CCs schedules a PDSCH in order to send each PDCCH. If cross-carrier scheduling is performed, only the first DL CC configured as the PDCCH monitoring DL CC sends the PDCCH. The PDCCH transmitted on the first DL CC schedules the PDSCHs of a second DL CC and a third DL CC using a CIF in addition to the PDSCH of the first DL CC. The second DL CC and the third DL CC not configured as the PDCCH monitoring DL CC do not send a PDCCH.

Meanwhile, cross-carrier scheduling is not supported for a PCell. That is, a PCell is always scheduled by its own PDCCH. The UL grant and DL assignment of a cell are always scheduled by the same cell. That is, if DL is scheduled on a second carrier in a cell, UL is also scheduled on a second carrier. A PDCCH order may be transmitted on only a PCell. Furthermore, in an aggregated cell, frame timing, Super Frame Number (SFN) timing, etc. may be aligned.

If an aggregation level on a PCell is 4 or 8, UE may monitor a single CSS. UE for which a CIF has not been set monitors a single USS if an aggregation level on an activated serving cell is any one of 1, 2, 4, and 8. UE for which a CIF has been set monitors one or more USSs if an aggregation level on one or more activated serving cells is any one of 1, 2, 4, and 8 as configured by an upper layer. The CSS and the USS may overlap with each other on the PCell.

UE in which a CIF associated with a PDCCH monitored in a serving cell has been set monitors a PDCCH which consists of a CIF in the USS of the serving cell and includes CRS scrambled by a C-RNTI. UE in which a CIF associated with a PDCCH monitored in a PCell has been set monitors a PDCCH which consists of a CIF in the USS of the PCell and includes CRC scrambled by an SPS C-RNTI. Furthermore, the UE may monitor the PDCCH by searching a CSS without a CIF. In relation to a serving cell in which a PDCCH is monitored, UE for which a CIF has not been set monitors a USS without a CIF for the PDCCH. UE for which a CIF has been set monitors a USS through a CIF for a PDCCH. If UE is configured to monitor a PDCCH in an SCell through a CIF in another serving cell, the UE may not monitor the PDCCH of the SCell.

Furthermore, UE may send uplink control information, such as Channel State Information (CSI) or an ACK/NACK signal received, detected, or measured from one or more DL CCs, to a BS through a predetermined single UL CC. The CSI may include a CQI, a PMI, an RI, etc. For example, if UE needs to send an ACK/NACK signal for data received from the DL CCs of a PCell and the DL CCs of an SCell, the UE may multiplex or bundle a plurality of ACK/NACK signals for the data received from each DL CC and send the plurality of ACK/NACK signals to a BS through the PUCCH of UL CCs of the PCell. In 3GPP LTE, if it is necessary to send an ACK/NACK signal for a DL CC, the following three cases are present.

1) An ACK/NACK signal for the transmission of a PDSCH indicated by a corresponding PDCCH in a subframe (n−k) may be transmitted in a subframe n. k∈K, and K is an M element aggregation $\{k_0, k_1, \ldots, k_{M-1}\}$ according to the subframe n and an UL/DL configuration. This corresponds to a case where an ACK/NACK signal for a common PDSCH is transmitted.

2) An ACK/NACK signal for the PDCCH of a subframe (n−k) indicative of the release of DL Semi-Persistent Scheduling (SPS) may be transmitted in a subframe n. k∈K, and K is an M element aggregation $\{k_0, k_1, \ldots, k_{M-1}\}$ according to the subframe n and an UL/DL configuration. An ACK/NACK signal for a PDCCH indicative of the activation of DL SPS is not transmitted.

3) An ACK/NACK signal for the transmission of a PDSCH not including a PDCCH corresponding to a subframe (n−k) may be transmitted in a subframe n. k∈K, and K is an M element aggregation $\{k_0, k_1, \ldots k_{M-1}\}$ according to the subframe n and an UL/DL configuration. This corresponds to a case where an ACK/NACK signal for SPS is transmitted.

In the above description, K is called a bundling window. That is, the bundling window refers to one or more DL subframes corresponding to an ACK/NACK signal in a single UL subframe. A wireless communication system may be basically divided into a Frequency Division Duplex (FDD) method and a Time Division Duplex (TDD) method. In accordance with the FDD method, uplink transmission and downlink transmission are performed while occupying different frequency bands. In accordance with the TDD method, uplink transmission and downlink transmission are performed at different times while occupying the same frequency band. In the case of an FDD system, M=1 and K={k0}={4}. Table 5 illustrates an example of a set K in a TDD system.

indicated by a PCFICH dynamically. An ePDCCH that may be multiplexed with a PDSCH may be introduced because the number of OFDM symbols used in a PDCCH is limited. In this case, in order to provide backward compatibility with an existing LTE system, a DL subframe may use both the PDCCH and the ePDCCH. For better performance, however, a subframe using only an ePDCCH not a PDCCH may be defined. A carrier type using only an ePDCCH is hereinafter called a New Carrier Type (NCT). The NCT may be applied to all the subframes, but may be applied to only a special subframe, such as a Multicast-Broadcast Single Frequency Network (MBSFN) subframe, or the DL subframe of an SCell in a CA environment.

The NCT is required to have low RS overhead through the optimization of an RS design. In accordance with the RS design of an NCT being discussed, the PSS/SSS and CRS of an existing LTE system are reused as RSs for time/frequency synchronization and performance tracking, but a transmission cycle for CRS transmission is configured to be 5 ms. Furthermore, the CRS is used as only an RS for performance tracking, that is, a Tracking RS (TRS), not an RS for demodulation. A CRS used in the NCT is hereinafter called a TRS in order to distinguish the CRS from an existing CRS.

An RS sequence $r_{l,ns}(m)$ for the TRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 5]}$$

In Equation 5, m=0, 1, . . . , $2N_{maxRB}1$, $N_{maxRB}$ is a maximum number of RBs, ns is a slot number within a radio frame, and l is an OFDM symbol number within a slot.

A pseudo random sequence c(i) is defined by the following gold sequence having a length of 31.

$$c(n) = (x_1(n+Nc) + x_2(n+Nc)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 6]}$$

In Equation 6, Nc=1600, and a first m-sequence is reset to $x_1(0)=1$, $x_1(n)=0$, m=1, 2, . . . , 30.

A second m-sequence is reset to $c_{init}=2^{10}(7(ns+1)+l+1)(2N^{cell}_{ID}+1)+2N^{cell}_{ID}+N_{CP}$ at the start of each OFDM sym-

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Meanwhile, as described above, in an existing LTE system, a DL subframe is divided into a control region to which control channels, such as PDDCCHs, PHICHs, and PCFICHs, are allocated, and a data region to which PDSCHs are allocated. The control region includes a maximum of the former 4 OFDM symbol of a first slot within the subframe, and the data region includes the remaining OFDM symbols. The number of OFDM symbols used in a control channel may be indicated by RC signaling semi-statically or may be bol. $N^{cell}_{ID}$ is a value signaled by the Physical Cell Identity (PCI) of a virtual cell or a BS, and $N_{CP}=1$ in a normal CP and $N_{CP}=0$ in an extended CP.

Meanwhile, if the index of a subframe for a TRS is pre-fixed in all the cells although a TRS is transmitted in cycle of 5 ms, a TRS collision between neighboring cells may occur.

For example, if subframes #0/#5 are used in TRS transmission of a 5 ms cycle and neighboring cells are synchronized as in a TDD system or a synchronization type FDD system, a TRS collision may occur between cells having the same cell ID. As a result, a PSS/SSS signal may not be successfully read, and performance is deteriorated.

In order to prevent a TRS collision, the present invention proposes a method of shifting a subframe or slot in which the TRS is transmitted. Hereinafter, an example in which the TRS is shifted in a subframe unit is described, but the TRS may be shifted in a slot unit. A subframe in which the TRS is transmitted may be indicated by an offset value on the basis of a subframe #0. For convenience of description, a subframe in which the TRS is transmitted is called a TRS subframe, and an offset indicated by a TRS subframe is called a TRS subframe offset.

For example, if the index of a TRS subframe is #2, the offset value of the TRS subframe is 2. The TRS subframe offset may have a value of 0 to 4°|, but may be defined to have a value of 0 or 1 or 0 to 3 in order to reduce the size of a bit. That is, the offset value is restricted to 0 or 1 if an offset of 1 bit is used and is restricted to 0 to 3 if an offset of 2 bits is used.

If a subframe of an existing type is used in a PCell and an NCT subframe is used in a SCell, the configuration of the subframe may be signaled through the PCell. In this case, a TRS subframe offset may be signaled through the PCell. Such a concept may also be applied to an SCell in which the reference cell of the NCT is different.

A TRS subframe offset may be included in system information for supporting initial cell search and transmitted. For example, the TRS subframe offset may be included in a Master Information Block (MIB) and transmitted through a PBCH or may be included in SIB1/2 and transmitted.

Meanwhile, if a TRS and PSS/SSS are transmitted in the same subframe, neighboring cell search is not influenced by a TRS subframe offset. Accordingly, radio resources may be allocated so that the PSS/SSS are transmitted in a subframe in which the TRS is transmitted. That is, the PSS/SSS may be transmitted in the subframe in which the TRS is transmitted.

Figure 12:
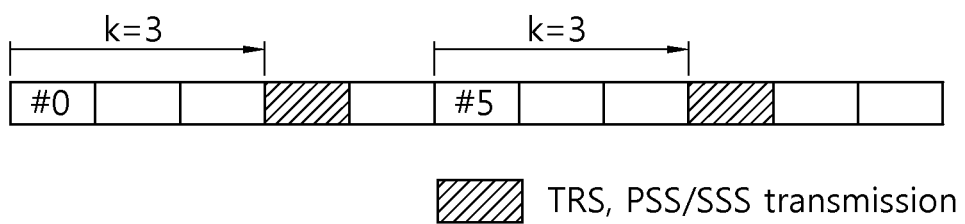
FIG. 12 illustrates an example in which radio resources are allocated.

FIG. 12 illustrates an example in which radio resources are allocated.

If a TRS subframe is shifted by k (k<5), the TRS is transmitted in subframes #k/#k+5. In this case, a PSS/SSS may also be transmitted in the subframes #k/#k+5.

Referring to FIG. 12, a TRS and a PSS/SSS are transmitted in subframes #3/#8.

UE may search for a neighboring cell by performing RRM measurement based on the TRS as described above. If a PSS/SSS are transmitted in the same subframe as that of the TRS as in FIG. 12, UE may also use the PSS/SSS in addition to the TRS. Accordingly, more precise RRM measurement is possible.

An antenna port in which a TRS and a PSS/SSS are transmitted may be changed for each subframe. If the TRS and PSS/SSS are transmitted in the same antenna port, UE may use the PSS/SSS in addition to the TRS. Accordingly, more precise time/frequency tracking are possible.

Meanwhile, in a TDD system, each subframe is determined to be an uplink subframe, a downlink subframe, or a special subframe depending on a subframe number. The special subframe is a subframe including a symbol allocated in downlink, a symbol used as a switch gap, and a symbol allocated in uplink. For an uplink-downlink configuration according to a subframe number, reference may be made to Paragraph 4.2 of 3GPP TS 36.211 V10.4.0.

An uplink-downlink configuration according to a subframe number is changed depending on TDD configuration mode. The number of subframes in which the TRS may be transmitted is also changed depending on TDD configuration mode because the TRS may be transmitted only in the downlink subframe and/or a special subframe.

In accordance with the current LTE specification, 7 types of TDD configuration mode from 0 to 6 are defined.

For example, in the TDD configuration 0, the uplink-downlink configuration is {D, S, U, U, U, D, S, U, U, U}. If a TRS is transmitted in a special subframe, the TRS may be transmitted in subframes #0, #1, #5, and #6, that is, in four subframes. In this case, a possible offset value is {0, 1}.

For example, in the TDD configuration 1, the uplink-downlink configuration is {D, S, U, U, D, D, S, U, U, D}. If a TRS is transmitted in a special subframe, the TRS may be transmitted in subframes #0, #1, #4, #5, #6, and #9, that is, in six subframes. In this case, a possible offset value is {0, 1, 4}.

For example, in the TDD configuration 2, the uplink-downlink configuration is {D, S, U, D, D, D, S, U, D, D}. If a TRS is transmitted in a special subframe, the TRS may be transmitted in subframes #0, #1, #3, #4, #5, #6, #8, and #9, that is, in eight subframes. In this case, a possible offset value is {0, 1, 3, 4}.

For example, in the TDD configuration 3, the uplink-downlink configuration is {D, S, U, U, U, D, D, D, D, D}. If a TRS is transmitted in a special subframe, the TRS may be transmitted in subframes #0, #1, #5, #6, #7, #8, and #9, that is, in seven subframes. Accordingly, all offset values are possible. However, since the subframes #2, #3, and #4 are uplink subframes, the application of the TRS subframe offsets {2, 3, 4} is partially limited.

Meanwhile, if a subframe indicated by a TRS subframe offset is an uplink subframe, a TRS may be transmitted in a special subframe or a downlink subframe that are included in subframes prior to the subframe indicated by the TRS subframe offset and that are the closest.

For example, if the TRS subframe offset is 2 in the TDD configuration 3, the TRS is transmitted in the subframe #1 not in the subframe #2. That is, the TRS is transmitted in the subframes #1 and #7.

For example, if the TRS subframe offset is 3 in the TDD configuration 4, the TRS is transmitted in the subframes #1 and #8.

Table 6 summarizes the aforementioned contents.

TABLE 6

| UL-DL configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | 0 | 1(, 2, 3, 4) | | | | 0 | 1(, 2, 3, 4) | | | |
| 1 | 5 ms | 0 | 1(, 2, 3) | | | 4 | 0 | 1(, 2, 3) | | | 4 |
| 2 | 5 ms | 0 | 1(, 2) | | 3 | 4 | 0 | 1(, 2) | | 3 | 4 |
| 3 | 10 ms | 0 | 1(, 2, 3, 4) | | | | 0 | 1 | | 2 | 3 | 4 |

TABLE 6-continued

| UL-DL configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | 0 | 1(, 2, 3) | | | 4 | 0 | 1 | 2 | 3 | 4 |
| 5 | 10 ms | 0 | 1(, 2) | | 3 | 4 | 0 | 1 | 2 | 3 | 4 |
| 6 | 5 ms | 0 | 1(, 2, 3, 4) | | | | 0 | 1(, 2, 3) | | | 4 |

Meanwhile, a BS may determine that the transmission of a TRS is omitted in a special subframe. That is, the TRS may be configured so that it is transmitted only in a downlink subframe. Table 7 illustrates a case where a TRS is transmitted only in a downlink subframe.

TABLE 7

| UL-DL configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | 0(, 1, 2, 3, 4) | | | | | 0(, 1, 2, 3, 4) | | | | |
| 1 | 5 ms | 0(, 1, 2, 3,) | | | | 4 | 0(, 1, 2, 3,) | | | | 4 |
| 2 | 5 ms | 0(, 1, 2) | | | 3 | 4 | 0(, 1, 2) | | | 3 | 4 |
| 3 | 10 ms | 0(, 1, 2, 3, 4) | | | | | 0 | 1 | 2 | 3 | 4 |
| 4 | 10 ms | 0(, 1, 2, 3,) | | | | 4 | 0 | 1 | 2 | 3 | 4 |
| 5 | 10 ms | 0(, 1, 2) | | | 3 | 4 | 0 | 1 | 2 | 3 | 4 |
| 6 | 5 ms | 0(, 1, 2, 3, 4) | | | | | 0(, 1, 2, 3) | | | | 4 |

Referring to Table 7, if a subframe indicated by a TRS subframe offset is an uplink subframe or a special subframe, a TRS may be transmitted in a downlink subframe that is included in subframes prior to the indicated by the TRS subframe offset and that is the closest.

Meanwhile, if an NCT is independently used in a specific cell, a TRS is required to be transmitted every 5 ms. Tables 8 and 9 illustrate cases where an NCT is independently used.

Figure 13:
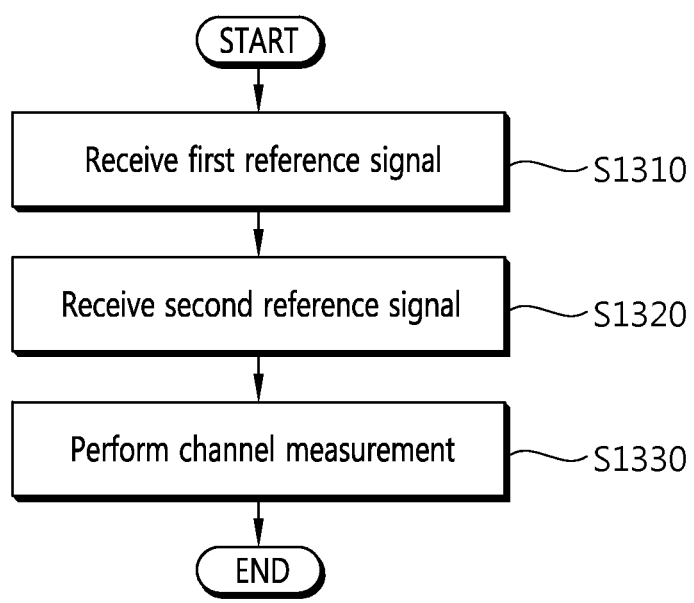
FIG. 13 illustrates a method of measuring a channel in a wireless communication system in accordance with an embodiment of the present invention.

As described above, a TRS may be used for channel measurement in wireless communication systems. FIG. 13 illustrates a method of measuring a channel in a wireless communication system in accordance with an embodiment of the present invention.

UE receives a first reference signal from a primary cell (S1310). The first reference signal may mean an existing CRS. The UE may demodulate a downlink control channel and downlink data based on the first reference signal. The first reference signal is transmitted in every 1 ms because the CRS is transmitted in all subframes.

The UE receives a second reference signal from a secondary cell (S1320). The second reference signal may mean

TABLE 8

| UL-DL Configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | 0 | 1(, 2, 3, 4) | | | | 0 | 1(, 2, 3, 4) | | | |
| 1 | 5 ms | 0 | 1(, 2, 3) | | | 4 | 0 | 1(, 2, 3) | | | 4 |
| 2 | 5 ms | 0 | 1(, 2) | | 3 | 4 | 0 | 1(, 2) | | 3 | 4 |
| 3 | 10 ms | 0 | 1(, 2, 3, 4) | | | | 0 | 1(, 2, 3, 4) | | | |
| 4 | 10 ms | 0 | 1(, 2, 3) | | | 4 | 0 | 1(, 2, 3) | | | 4 |
| 5 | 10 ms | 0 | 1(, 2) | | 3 | 4 | 0 | 1(, 2) | | 3 | 4 |
| 6 | 5 ms | 0 | 1(, 2, 3, 4) | | | | 0 | 1(, 2, 3, 4) | | | |

TABLE 9

| UL-DL configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | 0(, 1, 2, 3, 4) | | | | | 0(, 1, 2, 3, 4) | | | | |
| 1 | 5 ms | 0(, 1, 2, 3,) | | | | 4 | 0(, 1, 2, 3,) | | | | 4 |
| 2 | 5 ms | 0(, 1, 2) | | | 3 | 4 | 0(, 1, 2) | | | 3 | 4 |
| 3 | 10 ms | 0(, 1, 2, 3, 4) | | | | | 0(, 1, 2, 3, 4) | | | | |
| 4 | 10 ms | 0(, 1, 2, 3,) | | | | 4 | 0(, 1, 2, 3,) | | | | 4 |
| 5 | 10 ms | 0(, 1, 2) | | | 3 | 4 | 0(, 1, 2) | | | 3 | 4 |
| 6 | 5 ms | 0(, 1, 2, 3, 4) | | | | | 0(, 1, 2, 3, 4) | | | | | the TRS of an NCT. The UE may perform channel measurement based on the second reference signal. The second reference signal may be transmitted every 5 ms.

If the primary cell is a PCell using a subframe of an existing type and the secondary cell is an SCell using an NCT subframe, a subframe in which the second reference signal is transmitted may be indicated by an offset based on a subframe #10. The offset may be included in system information that is transmitted through a downlink control channel, such as a PBCH or a PDCCH and may be then signaled or signaled by a higher layer, such as an RRC layer.

Furthermore, a reference signal for synchronization, such as a PSS/SSS, may be transmitted in a subframe in which the second reference signal is transmitted. In this case, the reference signal for synchronization may also be transmitted in the same antenna port at that of the second reference signal.

In the case of a TDD system, a subframe in which the second reference signal may be transmitted is limited. That is, the second reference signal may be transmitted in a downlink subframe and/or a special subframe.

If the second reference signal is unable to be transmitted in a subframe indicated by an offset, the second reference signal is transmitted in a subframe that is included in subframes prior to the subframe indicated by the offset and that is the closest subframe in which the second reference signal may be transmitted, as in Tables 6 to 8.

The UE performs channel measurement on the secondary cell based on the second reference signal (S1330).

Figure 14:
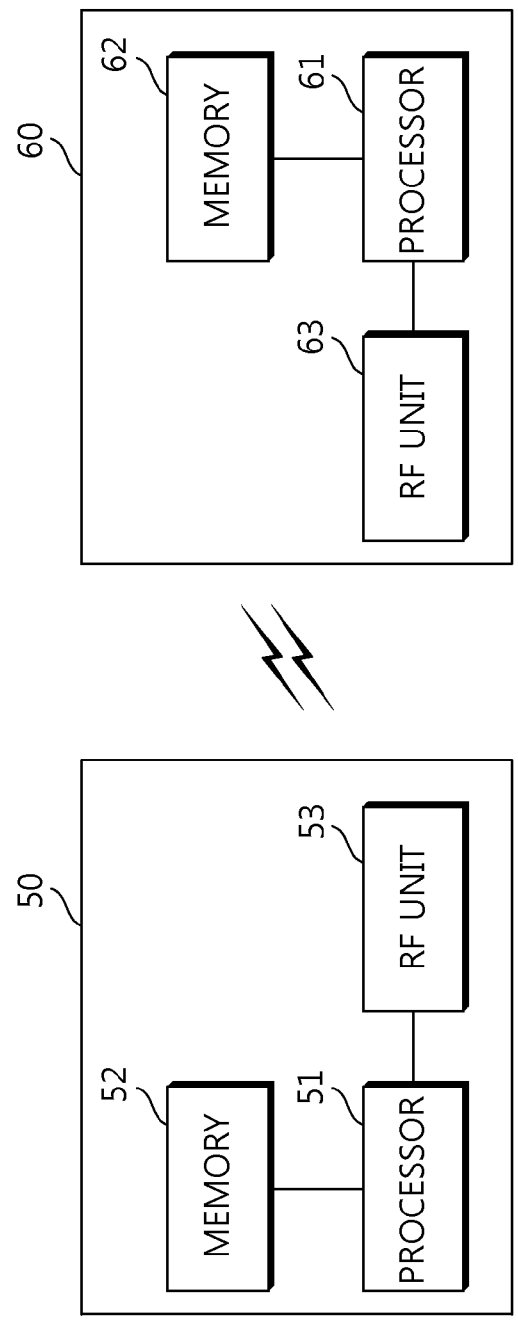
FIG. 14 is a block diagram illustrating a wireless communication system in which an embodiment of the present invention is implemented.

FIG. 14 is a block diagram illustrating a wireless communication system in which an embodiment of the present invention is implemented.

A BS 50 includes a processor 51, memory, 52 and a Radio Frequency (RF) unit 53. The memory 52 is connected to the processor 51 and stores various pieces of information for driving the processor 51. The RF unit 53 is connected to the processor 51 and sends and/or receives radio signals. The processor 51 implements the proposed functions, processes and/or methods. In the aforementioned embodiments, the operation of the BS may be implemented by the processor 51.

UE 60 includes a processor 61, memory, 62 and a Radio Frequency (RF) unit 63. The memory 62 is connected to the processor 61 and stores various pieces of information for driving the processor 61. The RF unit 63 is connected to the processor 61 and sends and/or receives radio signals. The processor 61 implements the proposed functions, processes and/or methods. In the aforementioned embodiments, the operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing radio signals. When the above-described embodiment is implemented in software, the above-described scheme may be implemented as a module (process or function) configured to perform the above function. The module may be stored in the memory and executed by the processor. The memory may be placed inside or outside the processor and connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method for measuring a channel in a wireless communication system, the method comprising:
   receiving a first reference signal from a primary cell;
   receiving a second reference signal from a secondary cell corresponding to the primary cell; and
   performing channel measurement on the secondary cell based on the second reference signal, wherein a subframe in which the second reference signal is received is signaled by the primary cell, and
   wherein, if the subframe signaled by the primary cell is an uplink subframe or a special subframe, the second reference signal is received in a downlink subframe that is included in plural subframes prior to the uplink subframe or the special subframe and that is closest to the uplink subframe or the special subframe.

2. The method of claim 1, wherein:
   the first reference signal is a Cell-specific Reference Signal (CRS) received every 1 ms, and
   the second reference signal is a Tracking Reference Signal (TRS) received every 5.

3. The method of claim 1, wherein the subframe in which the second reference signal is received is indicated by an offset based on a subframe #0.

4. The method of claim 3, wherein the offset is received through a downlink control channel of the primary cell.

5. The method of claim 3, wherein the offset is signaled from a Radio Resource Control (RRC) layer of the primary cell.

6. The method of claim 1, wherein receiving the second reference signal includes receiving a third reference signal for synchronization with the secondary cell, and
   wherein the third reference signal is received in a subframe in which the second reference signal is received.

7. A user equipment in a wireless communication system, the user equipment comprising:
   a Radio Frequency (RF) unit configured to transmit and receive radio signals; and
   a processor connected to the RF unit and configured to:
      receive a first reference signal from a primary cell,
      receive a second reference signal from a secondary cell corresponding to the primary cell, and
      perform channel measurement on the secondary cell based on the second reference signal,
   wherein a subframe in which the second reference signal is received is signaled by the primary cell, and
   wherein, if the subframe signaled by the primary cell is an uplink subframe or a special subframe, the second reference signal is received in a downlink subframe that is included in plural subframes prior to the uplink subframe or the special subframe and that is closest to the uplink subframe or the special subframe.

8. The user equipment of claim 7, wherein the subframe in which the second reference signal is received is indicated by an offset based on a subframe #0.

9. The user equipment of claim 8, wherein the offset is received though a downlink control channel of the primary cell.

10. The user equipment of claim 7, wherein the processor is configured to receive the second reference signal by receiving a third reference signal for synchronization with the secondary cell, and wherein the third reference signal is received in a subframe in which the second reference signal is received.

\* \* \* \* \*